(12) United States Patent
Narigapalli et al.

(10) Patent No.: US 12,056,353 B2
(45) Date of Patent: Aug. 6, 2024

(54) DYNAMICALLY ASSIGNING STORAGE OBJECTS TO COMPARTMENT CONSTRUCTS OF A STORAGE SYSTEM TO REDUCE APPLICATION RISK

(71) Applicant: Kyndryl, Inc., New York, NY (US)

(72) Inventors: Anil Kumar Narigapalli, Hyderabad (IN); Laxmikantha Sai Nanduru, R K Puram Post (IN); Pritpal S. Arora, Bangalore (IN); James E. Olson, Oxford, CT (US); Mark Vincent Chitti, Union, KY (US)

(73) Assignee: Kyndryl, Inc., New York, NY (US)

( * ) Notice: Subject to any disclaimer, the term of this patent is extended or adjusted under 35 U.S.C. 154(b) by 63 days.

(21) Appl. No.: 18/093,267

(22) Filed: Jan. 4, 2023

(65) Prior Publication Data
US 2024/0220102 A1 Jul. 4, 2024

(51) Int. Cl.
*G06F 3/06* (2006.01)
(52) U.S. Cl.
CPC .......... *G06F 3/0604* (2013.01); *G06F 3/0614* (2013.01); *G06F 3/0644* (2013.01); *G06F 3/067* (2013.01)
(58) Field of Classification Search
CPC .... G06F 3/0604; G06F 3/0614; G06F 3/0644; G06F 3/067
See application file for complete search history.

(56) References Cited

U.S. PATENT DOCUMENTS

| | | | |
|---|---|---|---|
| 5,930,154 A | 7/1999 | Thalhammer-Reyero | |
| 8,555,022 B1 | 10/2013 | Edwards et al. | |
| 8,825,963 B1 | 9/2014 | Edwards et al. | |
| 9,201,782 B2 | 12/2015 | Luan et al. | |
| 10,263,844 B1 * | 4/2019 | Wu | G06F 8/654 |
| 10,713,203 B2 | 7/2020 | Bai et al. | |
| 11,347,497 B1 * | 5/2022 | Dirks | G06F 8/65 |
| 2005/0240621 A1 | 10/2005 | Robertson et al. | |

(Continued)

FOREIGN PATENT DOCUMENTS

| | | | | |
|---|---|---|---|---|
| CN | 111324311 B | 9/2021 | | |
| WO | WO-2016164062 A1 * | 10/2016 | | G06F 9/455 |

*Primary Examiner* — Ryan Bertram
(74) *Attorney, Agent, or Firm* — Zilka-Kotab, P.C.

(57) ABSTRACT

A computer-implemented method, according to one embodiment, includes logically partitioning a storage system into a plurality of compartment constructs, and mapping hosts in communication with the storage system to the compartment constructs, thereby enabling interoperability among the hosts and the compartment constructs. The interoperability of the hosts and the compartment constructs is analyzed, and the interoperability is based on storage software and/or firmware versions being run by the hosts. The method further includes defining, based on the analysis, risk profiles for applications run on the hosts, and determining, based on the risk profiles, recommendations for assignment and mapping of the hosts with the compartment constructs. Ownership of storage objects is assigned to the compartment constructs based on the recommendations. Each of the storage objects define a logical partition of one of the hosts and a logical partition of a storage volume of the storage system.

20 Claims, 8 Drawing Sheets

(56) References Cited

U.S. PATENT DOCUMENTS

| | | | |
|---|---|---|---|
| 2008/0243947 A1* | 10/2008 | Kaneda | G06F 8/63 |
| | | | 707/999.203 |
| 2017/0031602 A1* | 2/2017 | Xu | G06F 8/62 |
| 2020/0074086 A1* | 3/2020 | Bulygin | G06F 21/572 |
| 2021/0303164 A1 | 9/2021 | Grunwald et al. | |
| 2022/0229851 A1 | 7/2022 | Danilov et al. | |

* cited by examiner

DYNAMICALLY ASSIGNING STORAGE OBJECTS TO COMPARTMENT CONSTRUCTS OF A STORAGE SYSTEM TO REDUCE APPLICATION RISK

BACKGROUND

The present invention relates to storage systems, and more specifically, this invention relates to dynamically assigning storage objects to compartment constructs of a storage system, identifying compartment constructs of a storage system, to thereby reduce application risk. This invention furthermore relates to an artificial intelligence (AI) infused methodology of simulating scenarios of various interoperability analysis between hardware, firmware, an operating system (OS) and software of storage components and applications, and dynamically assigning storage objects to compartment constructs of a storage system.

Storage capabilities and capacities continue to increase over time. With some conventional storage systems offering multi-petabyte capacity (and scalability), hundreds of applications may be housed on a single storage system. Storage is provisioned to various hosts that serve the applications, based on compatibility between host operating systems (OS) and storage systems, e.g., OS support for the storage systems. Over time, an application architecture may evolve with some applications moving to relatively newer compute platforms, while other applications remain on existing and/or legacy systems, where the latter likely eventually becomes outdated and reaches end-of-life support. This split in application evolvement may, in some use cases, occur because certain applications may run only on specific OS versions, and this dependency could stall OS upgrades on those hosts. Furthermore, this mix of supported and unsupported compute platforms, e.g., host operating systems, connected to (and operating with) the same storage system may interfere with storage system software and firmware upgrades. Hosts with unsupported/non-interoperable OS can therefore prevent storage systems software and/or firmware upgrades. Furthermore, the backdated storage firmware can also stall the app modernization and host upgrades which eventually creates a bottleneck to the overall business strategy. This may in turn have a cascading impact on the respective hosts and applications running on these storage systems. For example, not performing storage system software and/or firmware upgrades may prevent an ability to fix known defects in an existing storage system, which may in turn cause availability and performance issues, thereby adversely impacting all connected hosts.

SUMMARY

A computer-implemented method, according to one embodiment, includes logically partitioning a storage system into a plurality of compartment constructs, and mapping hosts in communication with the storage system to the compartment constructs, thereby enabling interoperability among the hosts and the compartment constructs. The interoperability of the hosts and the compartment constructs is analyzed, and the interoperability is based on storage software and/or firmware versions being run by the hosts. The method further includes defining, based on the analysis, risk profiles for applications run on the hosts, and determining, based on the risk profiles, recommendations for assignment and mapping of the hosts with the compartment constructs. Ownership of storage objects is assigned to the compartment constructs based on the recommendations. Each of the storage objects define a logical partition of one of the hosts and a logical partition of a storage volume of the storage system.

A computer program product, according to another embodiment, includes a computer readable storage medium having program instructions embodied therewith. The program instructions are executable by a computer to cause the computer to perform the foregoing method.

A system, according to another embodiment, includes a hardware processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically assigning storage objects to compartment constructs of a storage system, dynamically creating compartment constructs, and dynamically deleting compartment constructs, to thereby reduce application risk.

In one general embodiment, a computer-implemented method includes logically partitioning a storage system into a plurality of compartment constructs, and mapping hosts in communication with the storage system to the compartment constructs, thereby enabling interoperability among the hosts and the compartment constructs. The interoperability of the hosts and the compartment constructs is analyzed, and the interoperability is based on storage software and/or firmware versions being run by the hosts. The method further includes defining, based on the analysis, risk profiles for applications run on the hosts, and determining, based on the risk profiles, recommendations for assignment and mapping of the hosts with the compartment constructs. Ownership of storage objects is assigned to the compartment constructs based on the recommendations. Each of the storage objects define a logical partition of one of the hosts and a logical partition of a storage volume of the storage system.

In another general embodiment, a computer program product includes a computer readable storage medium having program instructions embodied therewith. The program instructions are executable by a computer to cause the computer to perform the foregoing method.

In another general embodiment, a system includes a hardware processor, and logic integrated with the processor, executable by the processor, or integrated with and executable by the processor. The logic is configured to perform the foregoing method.

Figure 1:
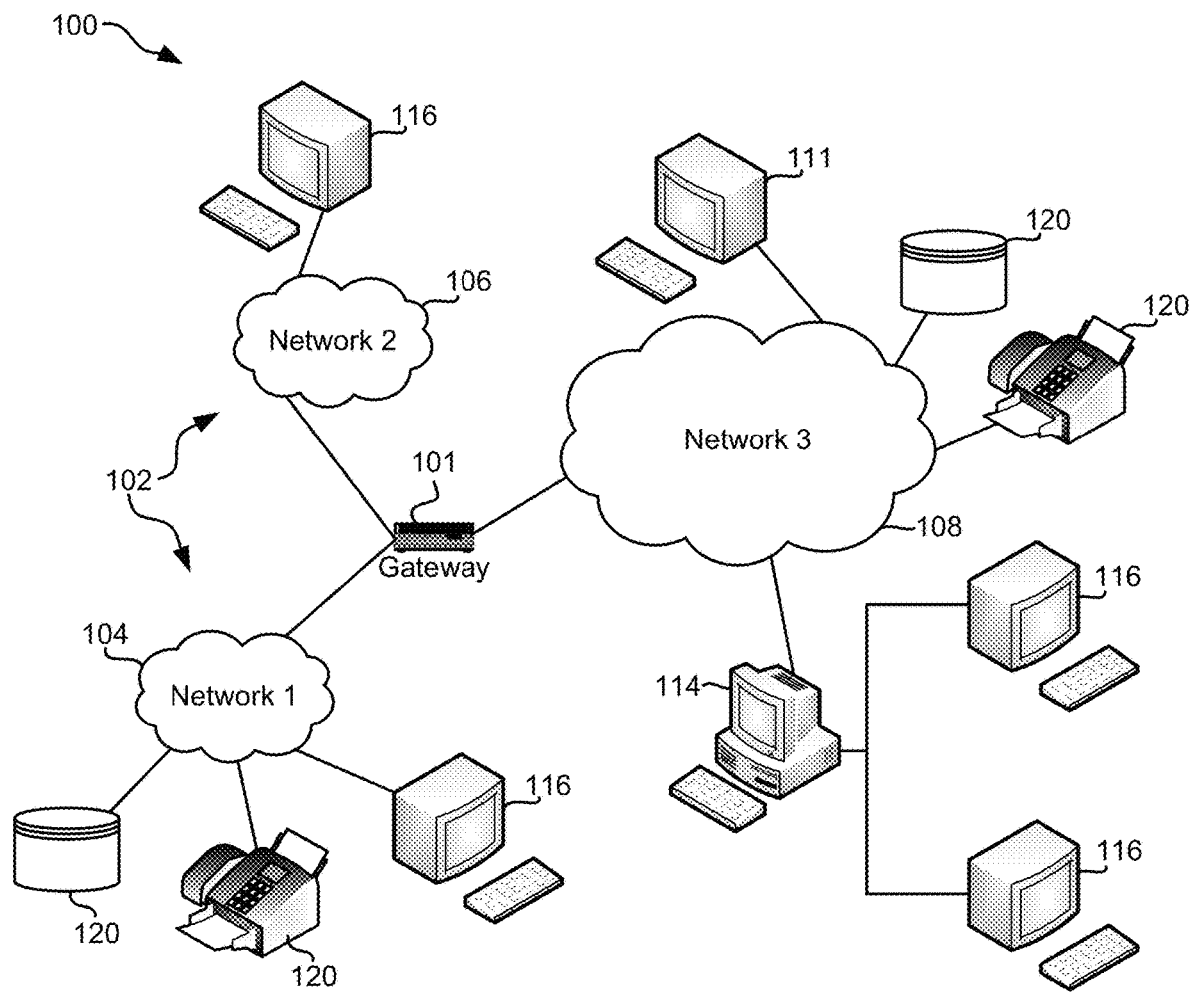
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
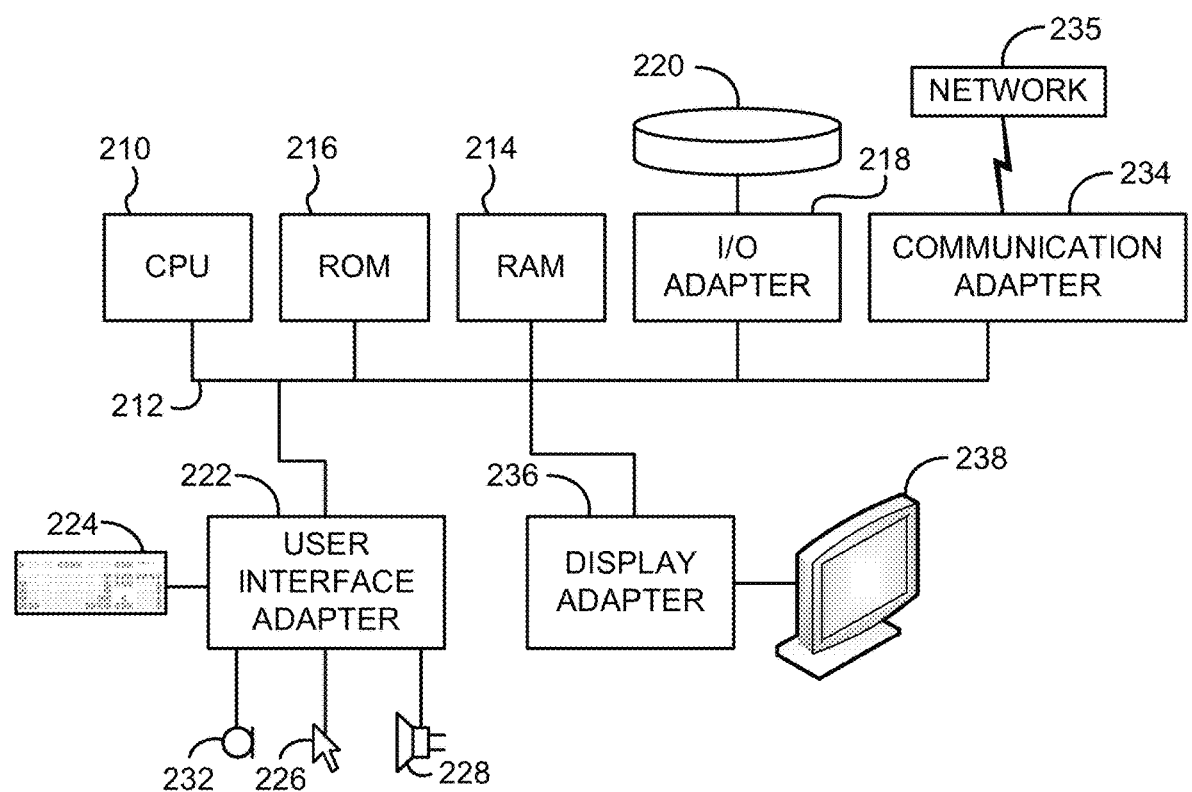
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using extensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere herein, storage capabilities and capacities continue to evolve and enhance over time. With some conventional storage systems offering multi-petabyte capacity (and scalability), hundreds of applications may be housed on a single storage system. Storage is provisioned to various hosts that serve the applications, based on compatibility between host operating systems (OS) and storage systems, e.g., OS support for the storage systems. Over time, an application architecture may evolve with some applications moving to relatively newer compute platforms, while other applications remain on existing and/or legacy systems, where the latter likely eventually becomes outdated and reaches end-of-life support. This split in application evolvement may, in some use cases, occur because certain applications may run only on specific OS versions, and this dependency could stall OS upgrades on those hosts. Furthermore, this mix of supported and unsupported compute platforms, e.g., host operating systems, connected to (and operating with) the same storage system may interfere with storage system software and firmware upgrades. Hosts with unsupported/non-interoperable OS can therefore prevent storage systems software and/or firmware upgrades. Furthermore, the backdated storage firmware can also stall the app modernization and host upgrades which eventually creates a bottleneck to the overall business strategy. This may in turn have a cascading impact on the respective hosts and applications running on these storage systems. For example, not performing storage system software and/or firmware upgrades may prevent an ability to fix known defects in an existing storage system, which may in turn cause availability and performance issues, thereby adversely impacting all connected hosts. Also, security related issues due to back dated OS, firmware, hardware or software leads to a relatively increased probability of vulnerabilities and associated threats. Accordingly, there is a need for mitigating the associated threats with back level storage software and/or firmware for connected hosts.

In sharp contrast to the deficiencies described above, techniques of various embodiments and approaches described herein overcome these deficiencies and eliminate the risk associated with back level storage software and/or firmware for connected hosts, by causing a shift from a unitary storage system architecture to a storage system with a compartmentalized structure. In this storage system with the compartmentalized structure, the storage system may be dynamically and logically subdivided into self-contained compartments, e.g., that serve a group of applications and/or hosts, which can be upgraded independently. This is preferably achieved by dynamically partitioning the storage system into compartment constructs and mapping the hosts to compartments such that they have interoperability. Autonomous decisions are made to create and/or delete compartments as needed. These techniques may additionally and/or alternatively include analyzing (continually) the host-storage compartment interoperability, e.g., the corresponding storage software and/or firmware versions. Risk profiles may be defined for hosts and/or applications based on associated storage software and/or firmware versions, and recommendations for optimal placement and mapping of hosts with compartments may be provided. The various logical hosts and nodes can be differentiated into various categories as nodes with similar performance, vulnerabilities, security, interoperability characteristics. Furthermore, the storage object ownerships may be dynamically assigned to each compartment and there may be an ability to independently upgrade the compartment(s).

This shift enables dynamic detection of the interoperability of hosts with specific storage software and/or firmware versions and makes autonomous decisions to move storage ownership between compartments to facilitate upgrades of specific compartments independently. Furthermore, this shift helps businesses by ensuring that transformed/modernized applications are run on relatively latest storage software and/or firmware, which improves availability and performance, while at the same time, contains the risk of back-dated storage software and/or firmware to specific compartments which serve legacy hosts and/or applications.

Figure 3:
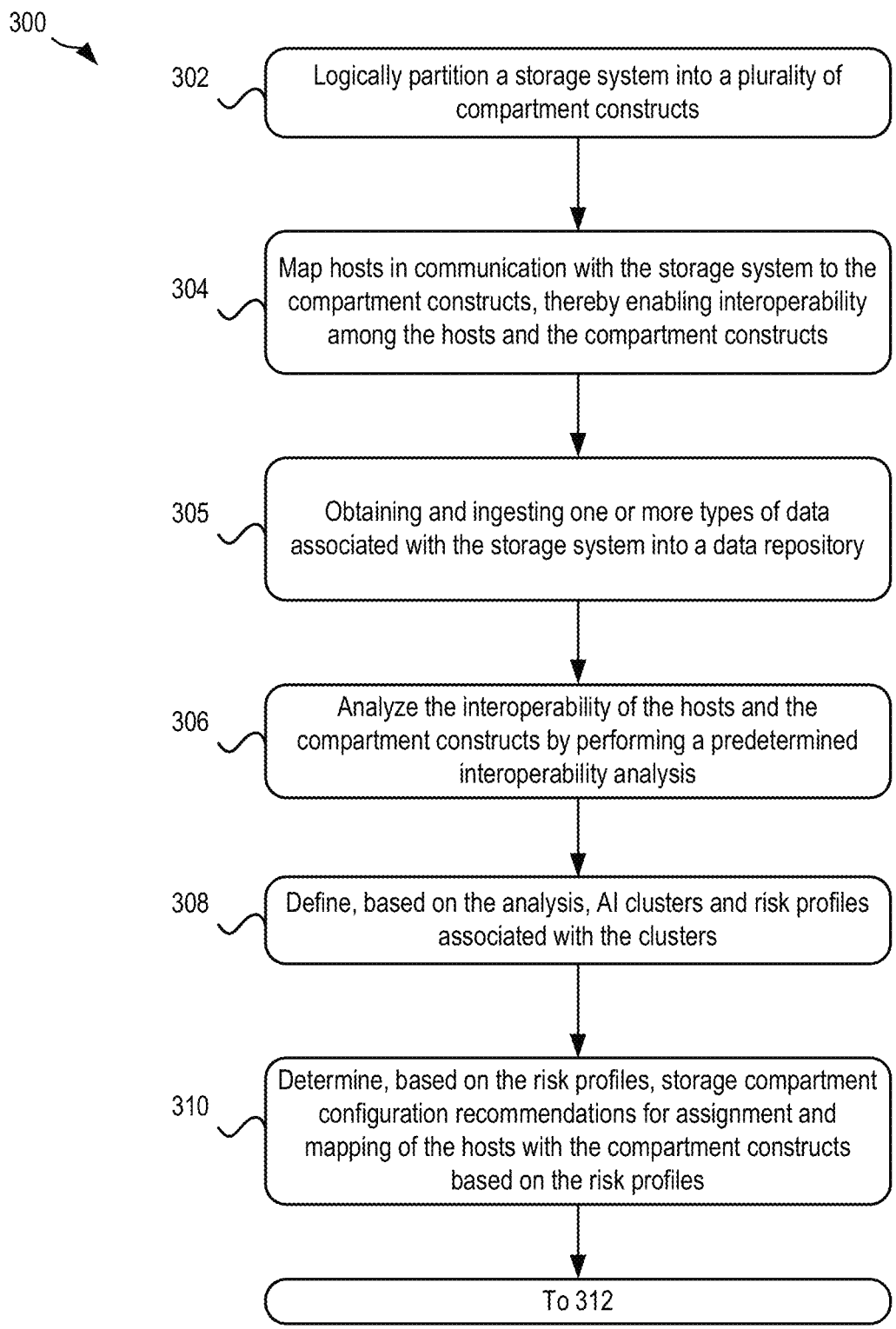
FIG. 3 is a flowchart of a method, in accordance with one embodiment of the present invention.
Figure 3:
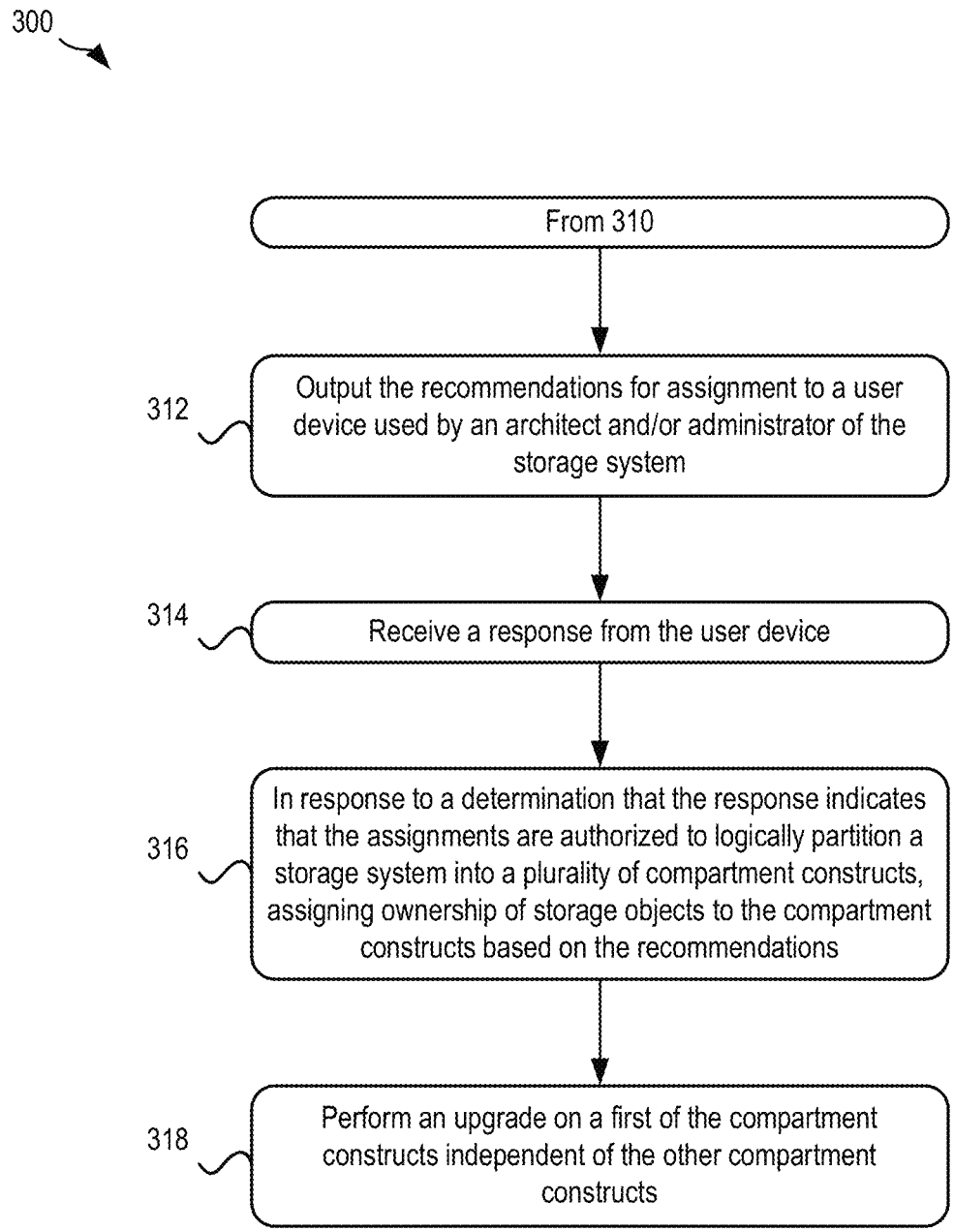

Now referring to FIG. 3, a flowchart of a method 300 is shown according to one embodiment. The method 300 may be performed in accordance with the present invention in any of the environments depicted in FIGS. 1-7, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 includes logically partitioning a storage system into a plurality of compartment constructs. The storage system may be a known type of storage system. In some preferred approaches, the storage system is in communication with one or more hosts that each run one or more applications, e.g., such as enterprise applications. In some preferred approaches, each of the hosts run several enterprise applications. The hosts may be host computers which may include a plurality of host adapters and/or ports which are configured to talk with a storage fabric of the storage system. One or more controllers may also be included in the storage system, and multiple of the controllers preferably have physical connectivity to several of the hosts. In one preferred approach, the storage system includes dual controllers, where the controllers serve as CPUs that process I/O requests for the storage system. Furthermore, the storage system may additionally and/or alternatively include several zones and/or a plurality of logical unit numbers (LUNs) and/or storage volumes. In one preferred approach, the storage volumes include physical disk storage, although the LUNs and/or storage volumes may additionally and/or alternatively include one or more other known types of storage depending on the approach.

The compartment constructs are storage subsystems, e.g., logical storage subsystems of the storage system. As will be described elsewhere below, each of the compartment constructs may include one or more logically assigned storage controllers, e.g., of a same software and/or firmware levels, and be connected to a set of LUNs and/or storage volumes. However, prior to the compartment constructs including such controllers and/or controller partitions and/or storage, the compartment constructs are established.

Hosts in communication with the storage system are mapped to the compartment constructs, e.g., see operation 304. In some approaches, the hosts are mapped to each of the compartment constructs to establish mapping that may thereafter be used for assigning ownership of storage objects to a given one of the compartment constructs. In contrast, in some other approaches, the hosts may be mapped to an associated of the compartment constructs. This mapping may be performed using one or more techniques that would become appreciated by one of ordinary skill in the art upon reading descriptions herein. Interoperability among the hosts and the compartment constructs is preferably enabled as a result of the mapping being established. Various techniques will now be described below for determining assignments and mapping with respect to the compartment constructs to thereby enable self-contained compartments which can be upgraded independently.

Operation 306 includes analyzing, the interoperability of the hosts and the compartment constructs. In some preferred approaches, analyzing the interoperability of the hosts and the compartment constructs includes performing a predetermined interoperability analysis, e.g., hosts, storage, OS, application software, etc., which may specifically include, e.g., capacity/performance analysis, DR requirement analysis, dependency analysis, etc. It should be noted that such analysis is continually performed throughout a life cycle of the storage system, because interoperability and/or performance metrics of the storage system will continue to adjust over time. In some preferred approaches, the interoperability is based on storage software versions and/or firmware versions and the operating system versions being run by the hosts, e.g., actively run on when the analysis is performed and/or historically previously run by the hosts. This analysis may be performed using data of the storage system. Accordingly, in some approaches, method 300 may include obtaining, e.g., receiving, collecting, accessing, etc., one or more types of data associated with the storage system, e.g., see operation 305. This data may include configurations and/or I/O operations processed by the storage system. For example, in some approaches, the data includes known types of configuration data of the storage system and/or related data from internal repositories and/or external repositories. The internal repositories may in some approaches include, e.g., inventory systems, discovery systems, configuration management database (CMDB), etc. In some other approaches, the internal repositories may additionally and/or alternatively include, e.g., AIOps and/or other application to infrastructure mappings. In some other approaches, the internal repositories may additionally and/or alternatively be associated with, e.g., performance, capacity monitoring and/or management tools, etc. The data may additionally and/or alternatively be obtained from internal repositories that deal with disaster recovery solutions, e.g., disaster recovery configuration documentation. In yet another approach, the internal repository may additionally and/or alternatively include architectural diagrams and artefacts. The external repositories may in some approaches include, vendor interoperability guidance information, e.g., storage data, compute data, network data, etc., which may be obtained from and/or associated with one or more predetermined companies that offer services and/or products.

In some approaches, the data may additionally and/or alternatively be obtained from one or more predetermined inventory systems, AIops and/or discovery systems. In one or more of such approaches, this data may be obtained from an application inventory, mapping data feed, updates, etc. These may be received and/or obtained from an application landscape that includes a plurality of applications that are each associated with hosts, e.g., physical and/or virtual, and storage volumes. In some other approaches, the data may additionally and/or alternatively include inoperability data, application to infrastructure mapping data, performance data, capacity data, etc.

Method 300 may include validating, normalizing and ingesting the data from internal and external repositories to a centralized data store, e.g., see operation 305. Accordingly, a predetermined data repository may be generated in which the data is organized. Depending on the approach, the predetermined data repository may be stored on one or more predetermined type of data storage devices and may reside internally or externally to the storage system.

In some approaches, the analysis may include processing the data of the predetermined data repository through a predetermined engine to discover and/or analyze dependencies and relationships among the data which may be used to perform risk profiling. For example, method 300 may include processing the data through a predetermined cognitive storage compartmentalization engine in order to analyze the data. In some approaches, the analysis may include performing interoperability analysis between, e.g., compute and/or network hardware and software., OSs, application versions and storage hardware (HW) and/or software (SW) versions, etc. The analysis of such an approach may additionally include DR configurations, and identify topology dependencies and/or relationships.

Performance and capacity profiles may additionally be analyzed to determine related requirements for compartment creation and/or deletion. In some preferred approaches, an AI technique may be used to analyze the data. For example, the data of the data repository may, in some approaches, be applied as an input for a trained AI model, e.g., the cognitive storage compartmentalization engine. More specifically, in one or more of such approaches, the trained AI model may be configured to generate the recommendations for assignment and mapping of the hosts with the compartment constructs. In some preferred approaches, the AI model is configured to perform one or more known types of clustering and simulation techniques using the obtained data. For example, in one of such approaches, DBScan clustering techniques and simulations are performed by the AI model using the obtained data associated with the storage system. Based on this clustering and simulation, the AI model identifies appropriate storage compartmentalizations. In some preferred approaches, the AI model uses a rules-based engine and/or predetermined case based reasoning (CBR) techniques that would become apparent to one of ordinary skill in the art upon reading the descriptions herein, to perform such clustering, simulations and/or determinations. More specifically, the recommendations for assignment may be determined based on predetermined rules that are applied by the trained AI model. For example, such predetermined rules may, in some approaches, define guarantees of the applications run by the hosts to customers that use the applications. For example, a non-exhaustive list of such rules may include and/or be based on, e.g., maintaining a disaster recovery solution that includes synchronously mirroring data in two storage systems, responding to a received user request within a predetermined amount of time, at least a predetermined threshold amount of capacity always being available, maintaining a group of applications with interdependencies in one specific compartment, etc. The storage compartmentalizations serve as the recommendations, which may be received as an output of the trained AI model.

In some other approaches, a predetermined AI technique may additionally and/or alternatively be employed against the ingested data to dynamically build AI clusters using machine learning (ML) based density-based clustering techniques, e.g., DBSCAN/OPTICS, to isolate high density points for performance and capacity profiles, interoperability between various entities, risk profiles, etc. Accordingly, method 300 may include defining, based on the analysis, risk profiles for applications run on the hosts. The risk profiles may be based on the associated software versions and/or firmware versions being run by the hosts in some approaches. These risk profiles may, in some approaches, be modeled by a cluster. Each of the cluster segments may be evaluated to autonomously determine the need for storage compartmentalization with a rules-based engine and case based reasoning (CBR) techniques. More specifically, outcomes of such clusters, e.g., results of applying rules of a predetermined rule repository, may be used as new cases to develop storage compartment recommendations of a plan which may be input into a "storage compartment plan generator," which will be described in greater detail elsewhere herein.

Operation 310 includes determining recommendations for assignment and mapping of the hosts with the compartment constructs. More specifically, in one approach, a determination that is based on the risk profiles. In such an approach, storage compartment configuration recommendations, e.g., a storage compartment need to create a compartment configuration, a storage compartment need to delete a compartment configuration, etc., for assignment and mapping of the hosts with the compartment constructs are determined based on the risk profiles. For context, this assignment includes logical ownership assignments placement of applications of a host to a determined one of the compartment constructs. Furthermore, this recommendation for assignment preferably includes assigning and mapping logical partitions of a host computer that include applications with predetermined similarities, e.g., similar OS versions, similar software versions, similar firmware, similar tolerances, similar customer guarantees, host interoperability, performance, capacity profiles, DR needs, etc., to the same compartment construct. This way, similar resources assigned to the same compartment construct may be updated independently without being otherwise prevented from doing so by other resources that are instead assigned to other compartment constructs based on not having the predetermined similarities.

Ownership assignments of a recommendation are in some preferred approaches not permanently made, but are instead temporarily made, as further recommendations may be dynamically performed based on an ongoingly changing state of the storage system. This determination of the storage compartment configurations may preferably be based on the analysis performed, e.g., see operations 308-310. In one preferred approach, this determination may be based on the AI clusters and/or risk profiles associated with the clusters. In one approach, determination of the recommendations includes determining the logical partitions of underlying physical components in storage subsystems, e.g., controllers and/or CPU. The determination may additionally and/or alternatively include determining host and/or storage adapter port mapping to logical controllers and/or CPU partitions, and in some approaches may additionally and/or alternatively include determining LUN and/or volume ownership changes. In order to determine such recommendations, in some approaches, analysis for optimal placement and mapping of hosts with compartments may be performed. For example, in one or more of such approaches, known techniques for estimating and/or performing test trials that would become apparent to one of ordinary skill in the art upon reading the descriptions herein may be used to evaluate a plurality of potential placements and mappings to determine a relatively most optimal one. In some approaches, each physical component, e.g., host and/or storage adapter ports, may be interoperated with n−3 to n+1 storage software and/or firmware versions operating independently for a configuration.

Ownership of storage objects may be assigned to the compartment constructs based on the recommendations. For example, a first of the storage objects may be assigned to an associated first one of the compartment constructs, a second of the storage objects may be assigned to an associated second one of the compartment constructs, etc. The assignment may include mapping each partition, e.g., hosts, controller partitions, etc., to a specific compartment construct for at least a duration of the assignment. In some approaches, the mappings of operation 304 may be used and/or updated to cause such assignments to be made. Furthermore, LUNs and/or volumes may be dynamically mapped to the compartment constructs, e.g., logical mapping of a logical partition of one or more volumes to the compartment construct. In some preferred approaches, each of the storage objects define a logical partition of one of the hosts, a logical partition of one of the controllers, and at least a portion of a storage volume of the storage system, e.g., a logical partition. In order to for these assignments to be made, in some approaches, a compartment plan generator may be used to enable compartment configuration changes of the recommendation to be made. For example, in some approaches, one or more updates may be performed on the existing logical partitions of the storage system, e.g., deleting at least one of the compartment constructs, logically partitioning the storage system into a new compartment construct where the new compartment construct is included in addition to the compartment constructs already existing in the storage system, creating a new compartment construct that is based on one or more portions of one or more existing compartment constructs, etc. As previously mentioned, in some approaches, the ownership assignments of hosts and/or volumes may be dynamically changed between the compartment constructs thereby facilitating seamless upgrade paths.

Based on these assignments, updates may be performed to related applications defined by a storage object. For example, an update may be assigned to a first compartment construct that has an ownership assignment of a first storage object. The update may then be performed on applications run by a host defined by the first storage object, e.g., where the storage object defines what the update is to be performed to.

In some approaches, assignment of the storage objects may be dependent on notification being made to and/or approval being given by one or more authorization entities. For example, in one approach, a storage compartmentalization plan may be output to architects and administrators for review and potential validation and approval. More specifically, in some approaches, method 300 may include outputting the recommendations for assignment to a user device used by an architect and/or administrator of the storage system, e.g., see operation 312. This way one or more architects may review and optionally approve the storage compartmentalization plan using the user device. A response may be received from the user device, where the response indicates whether the assignments are authorized to be performed, e.g., see operation 314. Assignment of ownership of the storage objects may be performed in response to a determination that the response indicates that the assignments are authorized to logically partition the storage system into a plurality of compartment constructs, e.g., see operation 316. Furthermore, ownership of the storage objects may not be assigned in response to a determination that the response indicates that the assignments are not authorized to be performed. User devices of one or more storage administrators may additionally and/or alternatively be used to execute the storage compartmentalization plan by implementing the configurations of the plan. Once the assignments are performed, updates may be performed to the software, firmware, etc., independently among the compartment constructs.

Based on the assignments described above being performed, storage compartments are put in place to mitigate risks for the application estate. More specifically, applications and/or host operating systems are provided viable upgrade paths that allow for storage software upgrades and firmware version upgrades to be pursued within a particular compartment construct. For example, method 300 may include performing an upgrade on a first of the compartment constructs, where the upgrade is performed independent of the other compartment constructs, e.g., see operation 318. In some approaches, in response to a determination that a predetermined collection of applications and/or host operating systems call for backdated storage software and/or firmware, the predetermined collection may thereby be isolated into one or more predetermined separate compartment constructs where they are maintained as-is until a determination is made that upgrade paths have emerged (if any). This way, this predetermined collection of applications and/or host operating systems are not able to prevent a second predetermined collection of applications and/or host operating systems that call for updated storage software and/or firmware from having such updates performed by available upgrade paths.

It should be noted that the logical partitioning described in operation 302 may, in some approaches, be initially performed and thereafter dynamically updated over time. This is because subsequent to a logical partitioning being performed, metrics, e.g., such as performance of applications, customer requests, storage capabilities and practices, etc., may continue to change over time. Accordingly, method 300 optionally includes re-assigning ownership of at least some of the storage objects based on updated recommendations.

Numerous benefits are enabled as a result of implementing embodiments and approaches described herein into storage systems. For example, as a result of this implementation, the storage system is logically compartmentalized such that each compartment construct has one or more controllers (of about the same software and/or firmware levels) connected to a set of LUNs and/or storage volumes. Each logical storage compartment construct has physical connectivity to hosts that have compatibility and/or interoperability, e.g., with host operating systems. Furthermore, outage and performance risks for application estates are reduced as a result of aligning and organizing them along a compartmentalized storage partition. This improves performance of computer devices associated with the storage system, and furthermore reduces an amount of processing that such computer devices ultimately perform, as disaster recovery events and/or security breach events are avoided as a result of ensuring that storage objects do not prevent other storage objects from being updated. Here, applications and host operating systems on supported upgrade paths may be modernized, while those that have a dependency on backdated storage software and firmware versions may continue to run as-is to thereby protect existing investments. Further benefits are based on the fact that businesses are, as a result of this implementation, not forced into making interim technology refresh decisions against a long-term tech roadmap of the business due to factors surrounding compatibility and/or interoperability between storage systems and host systems and/or applications. The dynamic logical partitioning of a storage system into a plurality of compartment constructs and assignment of storage objects thereto according to the techniques described herein has heretofore not been considered in conventional storage systems. Accordingly, the inventive discoveries disclosed herein with regards to such partitioning and assignments proceed contrary to conventional wisdom.

Figure 4:
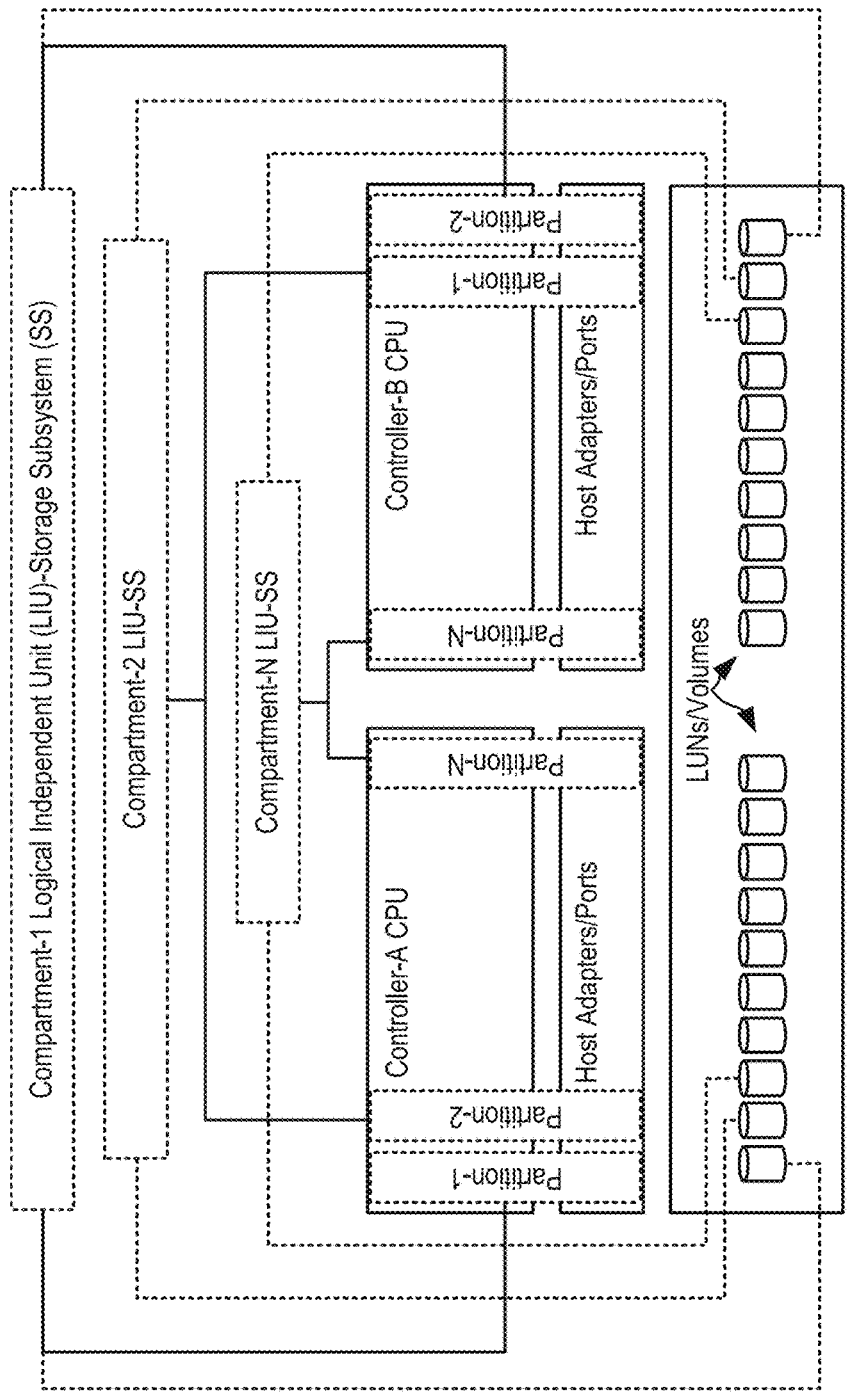
FIG. 4 is a storage system, in accordance with one embodiment of the present invention.

FIG. 4 depicts a storage system 400, in accordance with one embodiment. As an option, the present storage system 400 may be implemented in conjunction with features from any other embodiment listed herein, such as those described with reference to the other FIGS. Of course, however, such storage system 400 and others presented herein may be used in various applications and/or in permutations which may or may not be specifically described in the illustrative embodiments listed herein. Further, the storage system 400 presented herein may be used in any desired environment.

The storage system 400 includes a plurality of logical compartment constructs, e.g., see Compartment-1 Logical Independent Unit (LIU)-Storage Subsystem (SS), Compartment-2 LIU-SS and Compartment-N LIU-SS. Furthermore, the storage system 400 includes dial controllers, e.g., see Controller-A CPU and Controller-B CPU, having a core job of processing I/O requests of the storage system 400. Multiple physical components are also included in the storage system 400, e.g., see Host Adapters/Ports which are configured to talk to a storage fabric. The storage system 400 also includes storage components, e.g., see LUNs/Volumes which may be the logical partitions of physical disks that reside within the storage system. The logical compartment constructs are created and is encompassed by physical elements assigned thereto. More specifically, the physical elements of the storage system 400 are divided into multiple partitions. For example, a first portion of Controller-A and a first portion of the Host Adapter form Partition-1. Then, each of the partitions are assigned to a specific one of the compartment constructs so that when considering the compartment layer of the storage system 400, the compartment layer includes all the components needed to function as a storage system independently, e.g., thereby partitioning the storage system 400 into the plurality of storage subsystems (SSs) that are each configured to function autonomously from one another. In some approaches, these storage subsystems may be used to create a logical independence between applications that have compatibility issues. For example, assuming that five applications of the storage system are at risk, e.g., application availability, application performance, security with respect to an application stack, security with respect to a compute stack, security with respect to storage, etc., based on being grouped within an existing storage system with other legacy applications that accept current versions of the storage system firmware. In order to mitigate the risk to these five applications, the storage system may be logically partitioned into at least two compartment constructs, where the five applications are assigned to a first of the compartment constructs that allows a logical update of the firmware, while the legacy applications are assigned to a second of the compartment constructs to prevent interference with the firmware update.

It may be noted that, in some approaches, the dashed lines in FIG. 4 may indicate logical components and/or associations while the solid lines may represent physical elements.

Figure 5:
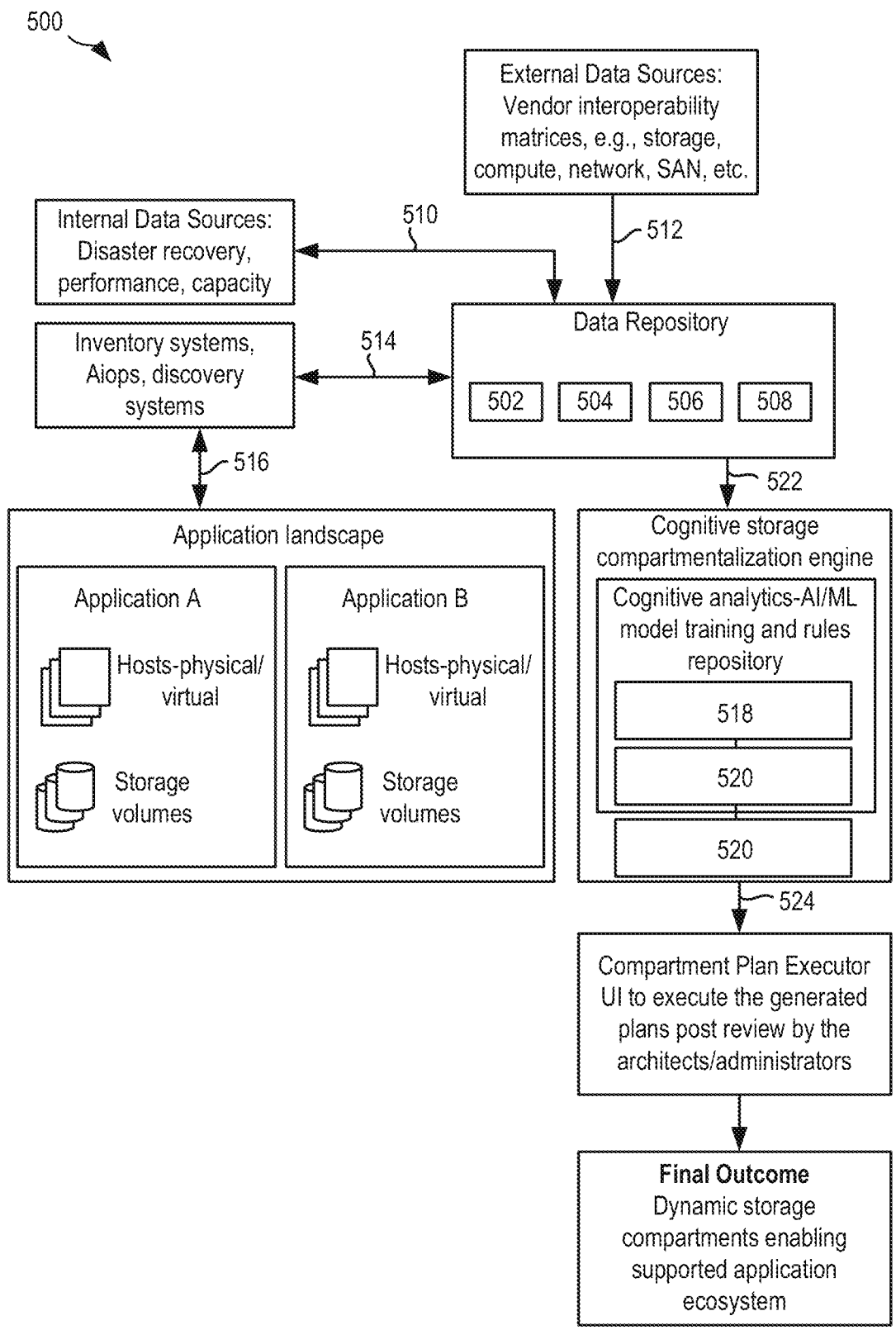
FIG. 5 is a flowchart of a method, in accordance with one embodiment of the present invention.

Now referring to FIG. 5, a flowchart of a method 500 is shown according to one embodiment. The method 500 may be performed in accordance with the present invention in any of the environments depicted in FIGS. 1-7, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Operations of method 500 demonstrate an end to end representation of dynamic storage system compartmentalization, in accordance with some approaches.

Method 500 includes obtaining data associated with a storage system. For example, in some approaches, the data may include known types of configuration data of the storage system and/or related data from internal repositories and/or external repositories. The internal repositories may, in some approaches, include internal data sources, e.g., disaster recovery data, performance data, capacity data, etc., which may be received as a data feed and updates, e.g., see operation 510. The data may additionally and/or alternatively be received from an external repository such as one or more external data sources. For example, in some approaches, such sources may include vendor interoperability matrices, e.g., storage, compute, network, SAN, etc., which may be received as a data feed, e.g., see operation 512.

In some approaches, the data may additionally and/or alternatively be obtained from one or more predetermined inventory systems, AIops and/or discovery systems, which may be received as a data feed and/or updated, e.g., see operation 514. In one or more of such approaches, this data may be obtained from an application inventory, mapping data feed, updates, etc., e.g., see operation 516. These may be received and/or obtained from an application landscape that includes a plurality of applications that are each associated with hosts, e.g., physical and/or virtual, and storage volumes.

The data may be validated, normalized and ingested using one or more techniques that would become appreciated by one of ordinary skill upon reading the descriptions herein. The data may then be organized in centralized data store, e.g., see data repository. Depending on the approach, the predetermined data repository may be stored on one or more predetermined type of data storage devices and may reside internally or externally to the storage system. The data repository may include interoperability data 502, application to infrastructure mapping data 504, performance capacity data 506, DR data 508, etc.

The method 500 may include performing analysis and may include processing the data of the data repository through a predetermined engine to discover and/or analyze dependencies and relationships among the data which may be used to perform risk profiling, e.g., see Cognitive storage compartmentalization engine. The engine may include feeding the data, e.g., see operation 522, into a cognitive analytics-AI/ML model training and rules repository, e.g., see components 518 and 520.

In some approaches, the trained AI model may be configured to generate the recommendations for assignment and mapping of hosts with the compartment constructs using a compartment plan generator. Such plans may be output to a compartment plan executor user interface, e.g., see operation 524, to execute the generated plans post review and/or authorization by predetermined architects/administrators. Thereafter the plan may be output as a final outcome which is performed by dynamically assigning ownership of storage objects to compartment constructs to enable an application ecosystem of independent subsystems.

Figure 6:
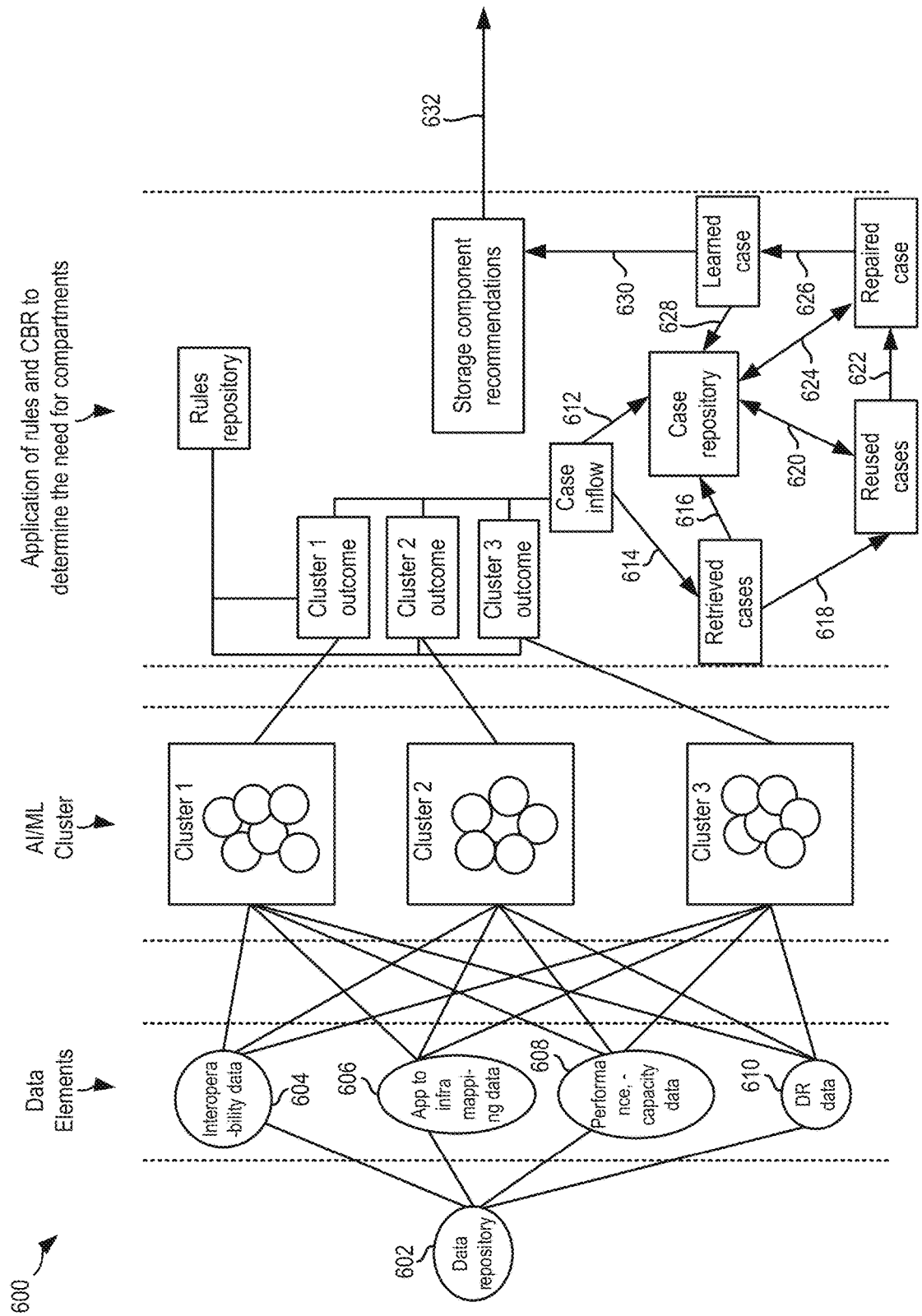
FIG. 6 is a flowchart of a method, in accordance with one embodiment of the present invention.

Now referring to FIG. 6, a flowchart of a method 600 is shown according to one embodiment. The method 600 may be performed in accordance with the present invention in any of the environments depicted in FIGS. 1-7, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Method 600 may include forming data elements from data of a data repository 602. The data elements may be formed using techniques that would become appreciated by one of ordinary skill in the art upon reading the descriptions herein. For example, the data elements may include interoperability data 604, application to infrastructure mappings data 606, performance capacity data 608 and disaster recovery data 610. Data of each of these data elements may be compared and known clustering techniques may be used to establish AI/ML clusters, e.g., see Cluster 1, Cluster 2 and Cluster 3, which include data with predetermined types and/or degrees of similarity. For example, these similarities may be based on application guarantees, performance metrics, software versions, firmware versions, capacities, disaster recovery solutions, host interoperability, performance, capacity profiles, DR needs, etc. Method 600 additionally includes applying rules, e.g., rules repository, to the clusters using an AI engine to determine cluster outcomes, e.g., see Cluster outcome 1, Cluster outcome 2 and Cluster outcome 3, which represent new cases and indicate an outcome of performance of the storage system based on the clusters being used with respect to the rules.

Method 600 includes feeding these new cases in a case inflow into the storage system, where the new cases are compared with an existing case repository, e.g., see Case repository and operation 612. This comparison sub-process may include retrieving cases, e.g., see operation 614, which may be potentially matched against cases of the existing case repository, e.g., see operation 616. In some approaches, one or more cases may be reused, e.g., see operation 618, and/or reused, e.g., see adaptation operation 620. In some approaches, the comparison sub-process may additionally and/or alternatively include revising cases, e.g., see operation 622, to establish repaired cases which may be verified, e.g., see operation 624. One or more repaired cases may be retained as learned cases, e.g., see retain operation 626, which may be learned by the case repository, e.g., see operation 628. An output of the sub-process may include storage compartment construct recommendations, e.g., see operation 630, which may be input into a predetermined storage compartment plan generator, e.g., see operation 632.

Figure 7:
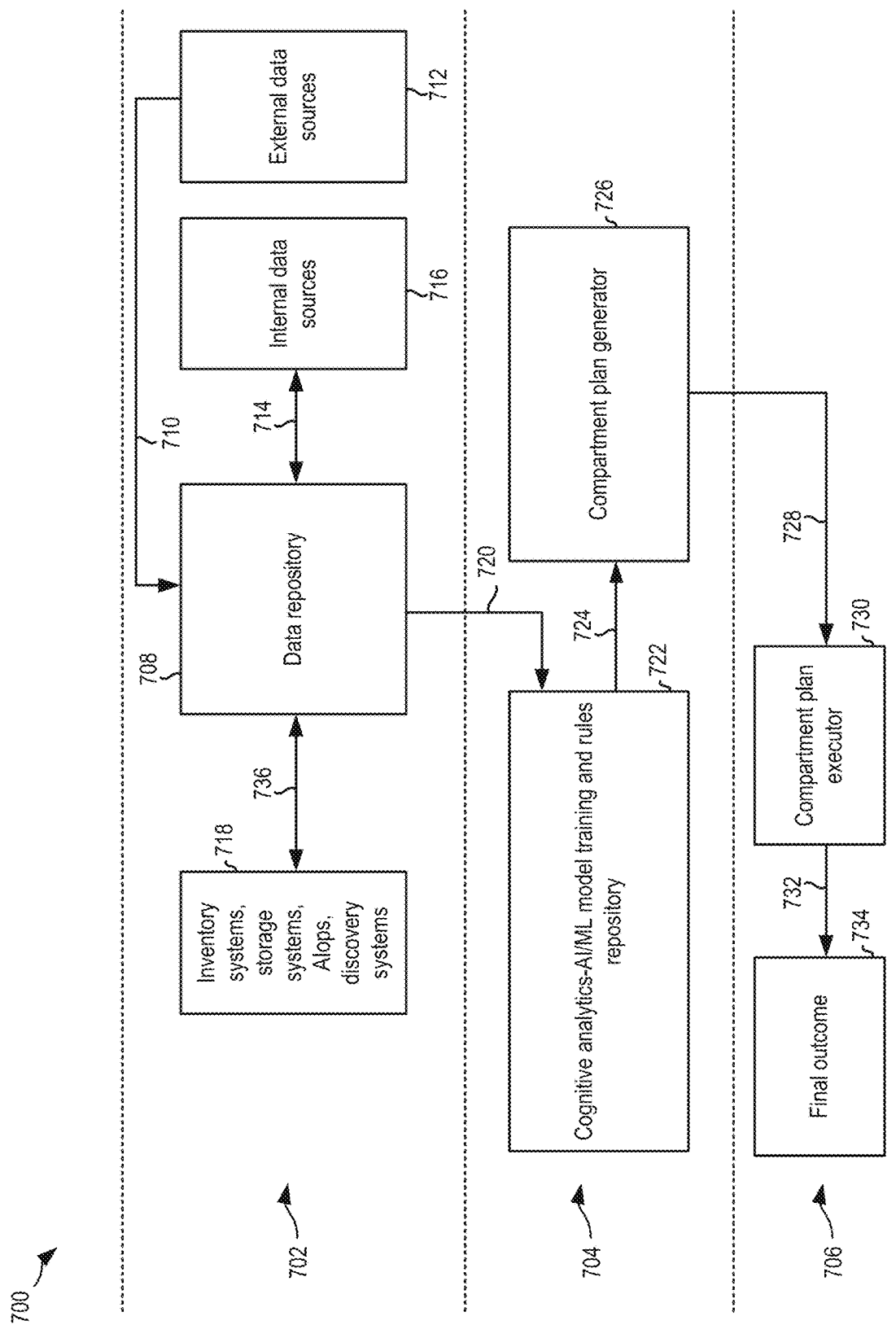
FIG. 7 is a flowchart, in accordance with one embodiment of the present invention.

FIG. 7 depicts a flowchart 700 for assigning ownership of storage objects to a plurality of compartment constructs, in accordance with one embodiment. As an option, the present flowchart 700 may be implemented in conjunction with features from any other embodiment listed herein, such as those described with reference to the other FIGS. Of course, however, such flowchart 700 and others presented herein may be used in various applications and/or in permutations which may or may not be specifically described in the illustrative embodiments listed herein. Further, the flowchart 700 presented herein may be used in any desired environment.

It may be prefaced that the flowchart 700 of FIG. 7 depicts a swimlane diagram of operations that may be performed to determine an ecosystem for application with storage object assignments that enable a relatively reduced risk for the applications.

In a data source and repository sub-portion 702 of the flowchart, a data repository 708 may be created and maintained which may establish a baseline of application to infrastructure maps, vendor interoperability matrices, DR needs, performance and capacity profiles, etc. The data repository 708 may include information obtained, e.g., see operation 710, in a data feed from external data sources 712 which may include vendor interoperability matrices. The data repository 708 may additionally and/or alternatively include information obtained, e.g., see operation 714, in a data feed and updates from internal data sources 716 which may include DR data, performance data, capacity management tool data, etc. In yet another approach, the data repository 708 may include information obtained, e.g., see operation 736, via a data feed and updates from inventory systems, storage systems, AIops, discovery systems, etc., e.g., see 718.

With reference now to a cognitive storage compartmentalization engine sub-portion 704 of the flowchart 700, data from the data repository 708 is fed, e.g., see operation 720, into a cognitive analytics AI/ML model training and rules repository 722. The model may analyze host interoperability, performance, capacity profiles, DR needs, dynamically build AI clusters, apply rules and CBR to the AI clusters and determine a need for compartment constructs. Analysis outputs of the model may be fed, e.g., see operation 724, into a compartment plan generator 726. The compartment plan generator 726 may prepare a plan to generate/de-generate dynamic partitions of storage subsystem components, e.g., logical controller/CPU partitions, host/storage adapter ports assignments, LUN/volume ownership changes, etc.

In a dynamic storage compartment sub-portion 706 of the flowchart 700, communication plans may be fed to user devices of a predetermined architect, e.g., see operation 728. More specifically, a compartment 730 plan executor may review and/or launch one or more of the plans, which may be performed and/or initiated by one or more predetermined architects, administrators, user devices, etc. An outcome is output, e.g., see operation 732, which creates a final outcome 734 that, when executed, may form a supported application ecosystem that is configured to protect existing investments of the storage system.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    logically partitioning a storage system into a plurality of compartment constructs;
    mapping hosts in communication with the storage system to the compartment constructs, thereby enabling interoperability among the hosts and the compartment constructs;
    analyzing the interoperability of the hosts and the compartment constructs, wherein the interoperability is based on storage software and/or firmware versions being run by the hosts;
    defining, based on the analysis, risk profiles for applications run on the hosts;
    determining, based on the risk profiles, recommendations for assignment and mapping of the hosts with the compartment constructs; and
    assigning ownership of storage objects to the compartment constructs based on the recommendations, wherein each of the storage objects define a logical partition of one of the hosts and a logical partition of a storage volume of the storage system.

2. The computer-implemented method of claim 1, comprising: performing an upgrade on a first of the compartment constructs, wherein the upgrade is performed independent of the other compartment constructs.

3. The computer-implemented method of claim 1, comprising: obtaining data about the storage system from internal and/or external repositories; and generating a data repository in which the data is organized.

4. The computer-implemented method of claim 3, comprising: applying the data of the data repository as an input for a trained artificial intelligence (AI) model, wherein the trained AI model is configured to perform predetermined clustering techniques and simulations to generate the recommendations, wherein the AI model uses a rules-based engine and/or predetermined case based reasoning (CBR) techniques to generate the recommendations; and receiving the recommendations as an output of the trained AI model.

5. The computer-implemented method of claim 4, wherein the recommendations are determined based on predetermined rules that are applied by the trained AI model, wherein the predetermined rules define guarantees of the applications, wherein the predetermined rules are selected from the group consisting of: maintaining a disaster recovery solution that includes synchronously mirroring data, responding to a received user request within a predetermined amount of time, and at least a predetermined threshold amount of capacity being always available.

6. The computer-implemented method of claim 3, wherein the data is selected from the group consisting of: inoperability data, mapping data, performance data, capacity data, and disaster recovery data.

7. The computer-implemented method of claim 1, comprising: updating the logical partitions of the storage system, wherein the updating is selected from the group consisting of: deleting at least one of the compartment constructs, and logically partitioning the storage system into a new compartment construct.

8. The computer-implemented method of claim 1, comprising: outputting the recommendations to a user device used by an architect and/or administrator of the storage system; and receiving a response from the user device, wherein the response indicates whether the assignments are authorized to be performed, wherein assignment of ownership of the storage objects is performed in response to a determination that the response indicates that the assignments are authorized to be performed.

9. The computer-implemented method of claim 1, comprising: re-assigning ownership of at least some of the storage objects of the storage system based on updated recommendations.

10. A computer program product, the computer program product comprising a computer readable storage medium having program instructions embodied therewith, the program instructions executable by a computer to cause the computer to:
  logically partition, by the computer, a storage system into a plurality of compartment constructs;
  map, by the computer, hosts in communication with the storage system to the compartment constructs, thereby enabling interoperability among the hosts and the compartment constructs;
  analyze, by the computer, the interoperability of the hosts and the compartment constructs, wherein the interoperability is based on storage software and/or firmware versions being run by the hosts;
  define, by the computer, based on the analysis, risk profiles for applications run on the hosts;
  determine, by the computer, based on the risk profiles, recommendations for assignment and mapping of the hosts with the compartment constructs; and
  assign, by the computer, ownership of storage objects to the compartment constructs based on the recommendations, wherein each of the storage objects define a logical partition of one of the hosts and a logical partition of a storage volume of the storage system.

11. The computer program product of claim 10, the program instructions executable by the computer to cause the computer to: perform, by the computer, an upgrade on a first of the compartment constructs, wherein the upgrade is performed independent of the other compartment constructs.

12. The computer program product of claim 10, the program instructions executable by the computer to cause the computer to: obtain, by the computer, data about the storage system from internal and/or external repositories; and generate, by the computer, a data repository in which the data is organized.

13. The computer program product of claim 12, the program instructions executable by the computer to cause the computer to: apply, by the computer, the data of the data repository as an input for a trained artificial intelligence (AI) model, wherein the trained AI model is configured to perform predetermined clustering techniques and simulations to generate the recommendations, wherein the AI model uses a rules-based engine and/or predetermined case based reasoning (CBR) techniques to generate the recommendations; and receive, by the computer, the recommendations as an output of the trained AI model.

14. The computer program product of claim 13, wherein the recommendations are determined based on predetermined rules that are applied by the trained AI model, wherein the predetermined rules define guarantees of the applications, wherein the predetermined rules are selected from the group consisting of: maintaining a disaster recovery solution that includes synchronously mirroring data, responding to a received user request within a predetermined amount of time, and at least a predetermined threshold amount of capacity being always available.

15. The computer program product of claim 12, wherein the data is selected from the group consisting of: inoperability data, mapping data, performance data, capacity data, and disaster recovery data.

16. The computer program product of claim 10, the program instructions executable by the computer to cause the computer to: update, by the computer, the logical partitions of the storage system, wherein the updating is selected from the group consisting of: deleting at least one of the compartment constructs, and logically partitioning the storage system into a new compartment construct.

17. The computer program product of claim 10, the program instructions executable by the computer to cause the computer to: output, by the computer, the recommendations to a user device used by an architect and/or administrator of the storage system; and receive, by the computer, a response from the user device, wherein the response indicates whether the assignments are authorized to be performed, wherein assignment of ownership of the storage objects is performed in response to a determination that the response indicates that the assignments are authorized to be performed.

18. The computer program product of claim 10, the program instructions executable by the computer to cause the computer to: re-assign, by the computer, ownership of at least some of the storage objects of the storage system based on updated recommendations.

19. A system, comprising:
  a hardware processor; and
  logic integrated with the processor, executable by the processor, or integrated with and executable by the processor, the logic being configured to:
  logically partition a storage system into a plurality of compartment constructs;
  map hosts in communication with the storage system to the compartment constructs, thereby enabling interoperability among the hosts and the compartment constructs;
  analyze the interoperability of the hosts and the compartment constructs, wherein the interoperability is based on storage software and/or firmware versions being run by the hosts;
  define based on the analysis, risk profiles for applications run on the hosts;

determine based on the risk profiles, recommendations for assignment and mapping of the hosts with the compartment constructs; and assign ownership of storage objects to the compartment constructs based on the recommendations, wherein each of the storage objects define a logical partition of one of the hosts and a logical partition of a storage volume of the storage system.

20. The system of claim 19, the logic being configured to: perform an upgrade on a first of the compartment constructs, wherein the upgrade is performed independent of the other compartment constructs.

\* \* \* \* \*